Nov. 12, 1968    M. B. ALLEN ET AL    3,410,249
AUTOMATIC DRINKING VALVE
Filed March 21, 1966                    2 Sheets-Sheet 2
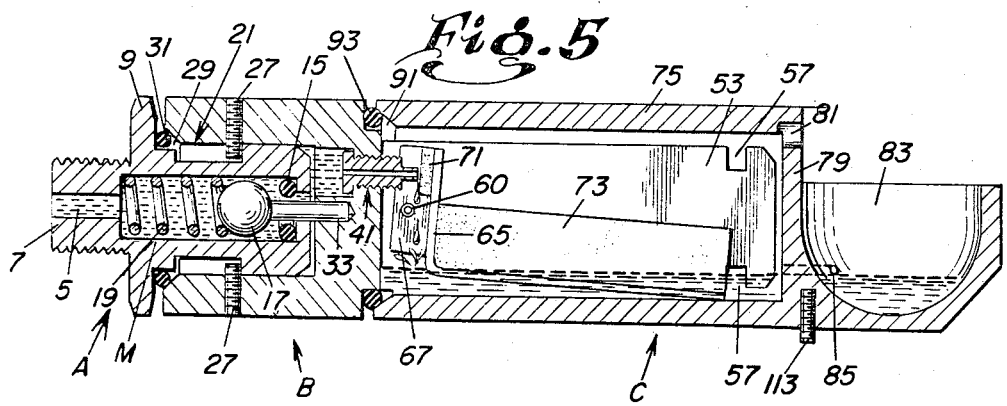
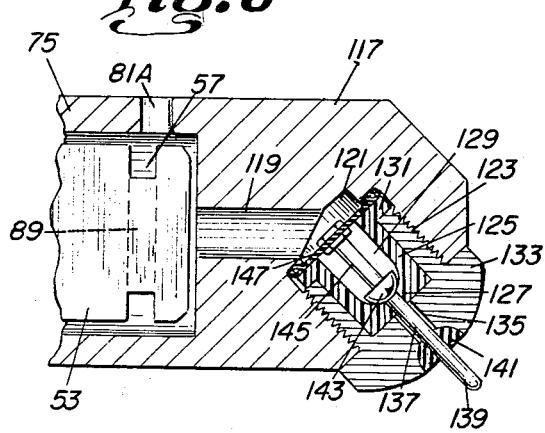
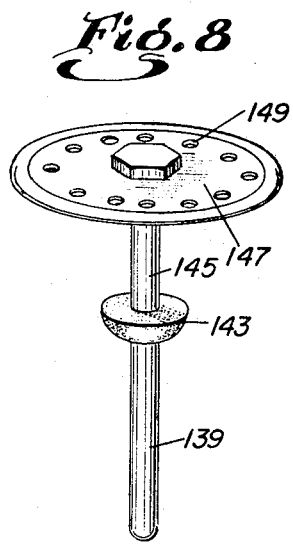
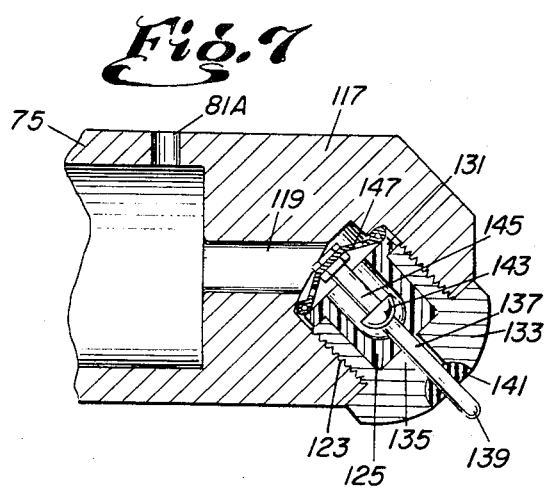
INVENTORS
Maurice B. Allen
BY Neil E. Walter
Peck & Peck
ATTORNEY

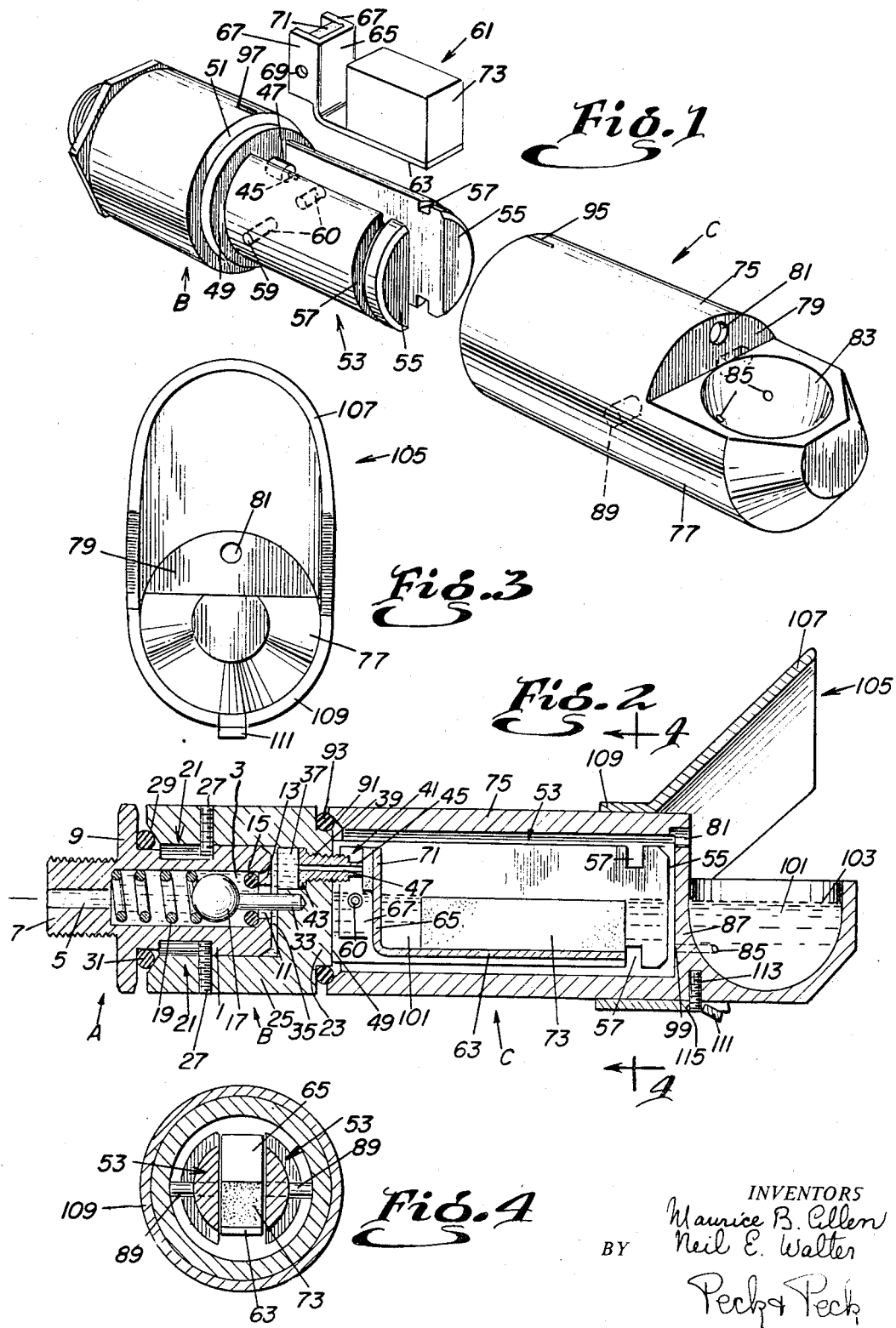

United States Patent Office 3,410,249
Patented Nov. 12, 1968

3,410,249
AUTOMATIC DRINKING VALVE
Maurice B. Allen, Burtonsville, and Neil E. Walter, Rockville, Md., assignors to Columbia Systems Company, Kensington, Md., a corporation of Maryland
Filed Mar. 21, 1966, Ser. No. 535,778
14 Claims. (Cl. 119—79)

ABSTRACT OF THE DISCLOSURE

A valve assembly having a water reservoir in communication with and between a water feed means and a water supply member. A float valve is provided within the reservoir to stop flow of water from the feed means when the water within the reservoir reaches a predetermined depth, which is below the opening from the water feed means. The water supply member is connected to and in communication with the reservoir below its water level.

---

The invention relates broadly to the art of valves for automatically supplying drinking water to vertebrates, and in its more specific aspects, it relates to such drinking valves which are automatic in their operation in maintaining a constant supply of drinking water in readiness at all times for the vertebrate, which may be a bird or small animal, and require substantially no maintenance in performing their function; and the nature and objects of the invention will be readily recognized and understood by those skilled in the arts to which it relates in the light of the following explanation and detailed description of the accompanying drawings illustrating what we at present believe to be preferred embodiments or mechanical expressions of our invention from among various other forms, arrangements, combinations and constructions, of which the invention is capable within the spirit and scope thereof.

The automatic drinking valves which we have developed and which will be disclosed in detail hereinafter, have been specifically designed for laboratory use where the vertebrate has been inoculated or otherwise infused with germs, disease carrying bacteria, and the like, which must be kept from the water supply system so as to prevent cross contamination of other vertebrates which may be using other drinking valves which are supplied from the same source of water.

It is conventional practice in laboratories and the like to test birds and small animals which have been inoculated with disease carrying germs, to provide a plurality of separate cages into each of which a single treated bird or small animal is put for observation and/or other treatment. It will be readily recognized that it is essential to provide drinking water in each of such cages and that such water supply means should be self operating and easily accessible to the treated bird or small animal. We have devised such a drinking water supply means which requires substantially no attention and involves certain other highly desirable and necessary attributes which will be discussed hereinafter.

One of the problems which has caused concern in the use of drinking valves of the general character in which we are interested, and which has resulted in the use of such valves being substantially curtailed, and when used of doubtful value and dangerous to the success of the tests being made, and to the birds and animals themselves, as well as to any user of the particular water supply is the imminent possibility of cross contamination of the water between the drinking valves. It will be appreciated that when such cross contamination does occur, as it may in prior drinking valves of which we are aware, birds and small animals will be subject to the disease germs of other animals using separate drinking valves which are supplied from the same source of water. Such defilement of the water supplying a plurality of drinking valves serving different birds and/or small animals jeopardizes the success of the tests being made as well as the birds or small animals. The drinking valve which we have evolved overcomes this problem which is inherent in prior art valves of this general character, for we have produced a drinking valve which is so designed that it is not possible for the water from any drinking valve to revert or flow back into the main source of supply, or to a branch supply line to any other drinking valve, to create the undesired and dangerous cross contamination.

We have accomplished the aforementioned very significant and highly desirable result in a simple manner, providing a drinking valve of relatively few parts, which requires little or no maintenance in the automatic operation thereof and may be produced economically.

It has been found in the use of drinking valves for birds which involves a drinking well in which is automatically maintained a supply of water for the bird, that food particles from the beak of the bird, and other deleterious material, drop into water in the well and may move backwardly into other water supply chambers which are provided in the drinking valve. This is clearly undesirable, and we have so designed the flow ducts to the well that it is substantially impossible for such deleterious matter to flow backwardly into any of the water being supplied to a particular drinking well or for that matter, into the water supply system.

One of the important and significant features of our invention resides in the structure and operational features whereby there is a constant or positive forward pressure toward the drinking well which aids prominently in preventing back flow and cross contamination.

In the design and development of this device we have been cognizant of the desirability of its easy connection into the conventional water supply systems, and we have so designed it so that this may be accomplished with facility. All that is necessary is to install a conventional standard regulator to reduce the normal line pressure below the usual 60 p.s.i.

While the drinking valve of this invention, under normal use conditions, will require little, if any, maintenance, it may be necessary at times to clean the water lines and ducts therein. With this in mind, we have greatly simplified the construction thereof so that it may be disassembled and assembled expeditiously, and, as will become apparent as this description proceeds, the water is automatically shut off when the device is disassembled.

It has been one of our purposes in the development of this automatic drinking valve to provide a type of water flow means where the duct is necessarily of small diameter, which is formed of a material which will not attract to it any metallic ions from the water which would clog up this relatively small water flow duct or passage.

One form of our invention relates to the feeding of water to small animals. This form of our invention, while providing certain novel and ingeneous structural characteristics especially for use by animals not having beaks, does follow the basic concepts of the bird drinking valve, for it prevents cross contamination, and involves the structural and operational features of the drinking valve which has been especially designed for use by birds which drink by means of their beaks.

While we have described this invention as being particularly applicable for use in clinical and laboratory use, it is to be distinctly understood that it is not intended to be so limited, for it is within our contemplation that both the bird drinking valve and the small animal feeder may be used domestically, that is a home owner or the like may install and use the valve for the use of birds and small animals in his yard or environs.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

FIG. 1 is an exploded view in perspective illustrating our automatic drinking valve.

FIG. 2 is a sectional view of the automatic drinking valve illustrating the contamination shield which may be applied thereto, if desired.

FIG. 3 is an elevational front view of the valve illustrated in FIG. 2.

FIG. 4 is a view taken on the line 4—4 of FIG. 2.

FIG. 5 is a view in section of the device of FIG. 1 illustrating the supply valve in open condition allowing water to flow into the float chamber.

FIG. 6 is a view in section, with parts thereof broken away, illustrating the automatic drinking valve particularly adapted for the feeding of water to small animals.

FIG. 7 is a view similar to FIG. 6 with the valve open in feeding or drinking condition.

FIG. 8 is a detailed elevation view of the diaphragm element used in the small animal automatic drinking valve illustrated in FIG. 6.

In the accompanying drawings, and particularly FIGS. 1 through 4 thereof, we have disclosed an automatic drinking valve which has been particularly designed for the feeding of birds and embodies the many desirable and advantageous characteristics, and others, which we have set forth above.

This automatic drinking valve comprises three major components which are detachably secured together so that the device may be disassembled with facility for cleaning or for any other purpose and easily assembled. These three major components comprise a line check valve designated generally by the letter A, a feeder line and float valve assembly which is removably connected to component A and which we have designated generally by the letter B, and the reservoir and bird drinking well, which we have designated generally by the letter C, and which is removably connected to component B. All of these components may be made out of any suitable metal or synthetic material, are of generally cylindrical configuration, and have been designed to expedite and reduce the cost of the production thereof, and to require substantially no maintenance or maintenance costs. While we have disclosed, merely for purposes of example, a particular type of line check valve A, it is to be distinctly understood that it is within our contemplation to employ in our combination any suitable and practical means for automatically shutting off the supply of water when the component A is removed from the remainder of the automatic drinking valve.

The line check valve A comprises a body portion 1 having a longitudinally extending centrally disposed water flow passage 3 therein, which is in communication with a reduced diameter water feed line 5, which is formed through an externally threaded nipple 7, which is preferably formed integral with the body portion 1 of the line check valve. The line check valve A is provided with an outer circular flange 9, which is provided on its external periphery with a plurality of flats so that a wrench may be applied thereto for the removal of the line check valve from the component B, which will be explained in more detail hereinafter.

The line check valve A is adapted to be removably connected by means of the nipple 7 to a conventional standard regulator which reduces the p.s.i. of the conventional water source down to any pressure at which it is desired, or deemed suitable to operate our automatic drinking valve.

At the forward end of the water flow passage 3 in the line check valve A, we provide a reduced diameter water flow outlet 11 and against the rearward shoulder 13, which is formed by this reduced diameter outlet flow passage 11, we employ an O ring 15. Operatively positioned within the water flow passage 3 of the line check valve A, is a conventional ball valve 17 which is biased forwardly toward the O ring 15, to close the water outlet 11, when the O ring is engaged by the ball valve, by means of a coil or spiral spring 19, which at its forward end operatively engages the ball valve 17, and at its rearward end is pressed against the shoulders formed by the reduced inlet duct 5 of the nipple 7. The line check valve A is provided with conventional bayonet slots which we have designated in their entirety by the numeral 21, these bayonet slots being adapted to removably attach the component B to the line check valve A, in a manner to be described.

The feeder line and float valve assembly B comprises a forward generally cylindrical solid body portion 23, rearwardly from which extends an annular tubular element 25, which is of a diameter to snugly, and with a sliding fit, receive therein the line check valve A. Forwardly spaced from the rear end of the flange 25 are a pair of locking pins 27 which are fixed within the element 25, in diametrically opposed relation, and extend toward each other and into the interior of the element 25, and these locking pins are adapted to slidably fit into the longitudinal groove of the bayonet slots 21 and then upon a slight rotational action to slide into the circumferential portion of such bayonet slots to securely hold and removably connect the line check valve A with the component B. When these two components are connected together as just described, the rear end of the element 25, which is undercut as at 29, will bear against and be sealed by means of an O ring 31, which is inserted in position between such undercut portion 29 and the flange 9 of the line check valve. The body portion 23 is provided with a ball valve opening pin 33, which is fixed within said body portion and extends therefrom into the water flow passage 3, and through and beyond the O ring 15, so that when the component B is attached to the component A, the valve opening pin 33 will engage the ball valve 17 and force it rearwardly toward the nipple 7, against the action of the spring 19 to open the passage 11 for flow of water therethrough.

When the line check valve A and the feeder line and float valve assembly B are disassembled, it will be appreciated that the pin 33 will be removed from operating contact with the ball valve 17, so that under the action of the spring 19, the ball valve will be urged against the O ring 15 to seal the passage 11 against flow of the water from the passage 3. Consideration of the drawings, and especially FIG. 2 thereof, will clearly show that when the component A and the component B are assembled in operative condition, the forward end of the line check valve A will be adjacent to but removed from the rear end of the body portion 23 of the component B, so that water which has flowed through duct 11 may flow between components A and B, for a purpose to be hereinafter described.

The body portion 23 is drilled or otherwise provided adjacent the upper forward end of the water passage 3 to provide a chamber or recess 37 for receiving water in its forward feeding passage through the device from the area or space 35. The chamber 37 is in communication with an internally threaded diametrically reduced drilled opening 39 which extends through the forward portion of the body 23. Threadedly mounted within the opening 39 is a water feed screw designated generally by the numeral 41, this screw having a head 43 thereon which seats against the forward wall of the chamber 37, and the screw extends through and beyond the forward wall of the body 23 and is preferably, though not necessarily, provided with a forward reduced diameter outlet portion 45. The screw 41 and head 43 and the reduced diameter portion 45 are provided with a centrally disposed longitudinally extending duct or water feed channel 47 extending therethrough. This feed screw 41 is preferably formed of nylon which, in this particular use, is advantageous since any metallic ions that may be in the water that is flowing through the screw 41 will not be attracted and drawn to the screw, since it is formed of nylon, whereas if it were formed of metal, such ions would be attracted to it and would be likely to cause a clogging of the drilled water feed duct 47 through the screw.

The forward wall of the body portion 23 is provided with a centrally positioned reduced diameter portion 49 which provides a shoulder 51 for a purpose to be hereinafter described. A pair of diametrically spaced apart forwardly projecting arms designated in their entirety by the numeral 53 extend from the reduced diameter portion 49. These forwardly projecting spaced apart arms 53 are preferably, though not necessarily, formed integrally with the body portion 23 of the component B, and are semicircular in cross section. Adjacent to, but inwardly removed from, the forward end 55 of each of the arms 53, we provide a circumferentially extending groove 57, and we also provide in each arm a journal opening 59 for receiving a pivot pin 60, for a purpose which will become apparent as this description proceeds. Consideration of FIG. 1 in particular, of the drawings, indicates that these journal openings 59 and pivot pins 60 are forwardly spaced a distance from the forward ends of the arms 53.

The arms 53 serve a dual function in the operation of the device, for they not only provide a pivotal mounting and supporting means for a float valve, but they also serve to support and lock in operative assembled position a reservoir housing and bird drinking well.

A float valve assembly, which is designated generally by the numeral 61, is provided for mounting in a pivotal manner on and between the pair of arms 53, to thereby control the depth or amount of water which is contained in the component C, comprising the reservoir and bird drinking well.

The float valve assembly comprises a fabricated metallic supporting arrangement for the float member itself and for the valve which closes the water outlet in the water feed screw 41, as will be explained. The fabricated metallic structure provides a float supporting platform 63 of generally rectangular configuration, from the rear end of which upwardly extends a supporting arm 65, from the vertical edges of which are formed a pair of inwardly extending supporting flanges 67. Each flange is provided with an aligned journal opening 69, which as will be explained, receives pivot pins 60. Adhesively, or otherwise secured to the rear face of the supporting arm 65 is a neoprene block 71, which, as we shall explain, when the device is operating, functions to engage and be disengaged from the outlet end 45 of the feeder screw 41, to control the flow of water therefrom. A float 73 of block-like form, which is preferably formed of styrofoam is adhesively or otherwise secured in upright position on the float supporting platform 63 of the assembly 61. The float assembly 61 is of a width so that it may operate in its rocking motions between the arms 53, and this assembly 61 is pivotally mounted in operative position between the arms 53.

The float and valve assembly 61 is mounted in operative position between the arms 53 and is positioned therein so that the apertures 69 in the flanges 67 will be aligned with the apertures 59 in the arms, whereupon the pivot pins will be driven into the apertures 59 and into the apertures 69 in the flanges so that the float and valve assembly 61 will be pivotally or rockably mounted in position between the arms 53.

The reservoir and bird drinking well component C consists of a generally cylindrical hollow rear body portion 75 which is of a diameter substantially the same as the diameter of the body portion of the component B. The forward portion 77 of the reservoir and feeding well C is of reduced depth relative to the depth or diameter of the body portion 75, and provides an upwardly extending upper wall portion 79 in which we provide a venting aperture 81. A bird drinking well 83 is provided in the reduced depth forward portion 77 of the component C, and, of course, this drinking well 83 is open at its top so that birds may drink with their beaks therefrom. Adjacent to but upwardly spaced from the bottom of the bird drinking well 83 are a pair of spaced apart water feed ducts 85 which extend through the wall 87 separating the interior of the cylindrical reservoir section 75 from the bird drinking well.

A pair of oppositely disposed lockiing pins 89 are fixed to and extend inwardly into the body section 75. When the component C is assembled with the other components of the device, including the members A and B, the reservoir section 75 is slid over and in position embracing and enclosing the forwardly extending arms 53, and with the locking pins 89 extending into the space between the two forwardly extending arms 53. The rear periphery of the body section 75 is beveled as at 91, and we provide an O-ring 93 which is inserted in position between the shoulder 57 of the body section 23 and the beveled peripheral edge of the body section 75. The body section 75, with the pins 89 extending between the forwardly projecting arms 53, is moved rearwardly toward the component B until the beveled edge 91 bears against the O ring 93 to thereby provide a seal between the components B and C. When the component C has been positioned as described, the locking pins 89 will be in position adjacent to the locking grooves 57 in the forward portion of the arms 53, and when this position of the member C is reached, the assembler will rotate the member C 90° so that the locking pins 89 move into the grooves 57 to thereby removably detach the component C to the component B. The component C is provided with a registry line 95, while the component B is also provided with a registry line 97. Now, the person assembling the device by this described rotative action of the component C relative to the member B, will know that these two members are in proper relative locking positions when the registry lines 95 and 97 are in alignment, and the bird drinking well will be in upright position in readiness to automatically receive water from the device for drinking by birds.

With the components A, B and C mounted together as described above, the inlets 99 of the ducts 85 will be positioned so that one of said inlets is opposite to and spaced from an end 55 of one arm 53, while the other inlet will be opposite to and spaced from the end 55 of the other arm 53.

With the elements of the device attached together as we have described, the pin 33 will cause retraction of the ball valve 17 to permit water to flow from the standard regulator and through the water flow passage 13, the chamber 37 and the drilled hole feed duct 47, all as disclosed in FIG. 2 of the drawings.

It will be appreciated that in the filling of this device, or when water is needed to be supplied to the reservoir, the float valve assembly will be pivoted on the pin 60 into downward position as disclosed in FIG. 5 of the drawings, so that the neoprene member 71 will be removed from closing contact with the outlet of the drilled feed duct 47, so that water may flow into the reservoir section 75 of the component C. The valve and float assembly 61 is so mounted and related relative to the feed screw 41 that, when the desired volume of water 101 is present in the reservoir section 75 and in the bird drinking well 83, the float will be raised and the assembly pivoted on the pivot pins 60 to cause closing of the feed duct 47 by the neoprene element 71. In connection with this structural and mounting relation between the assembly 61 and the water flow line, comprising the feed screw 41, it has been our purpose to so relate these members that the water level 103 in both the bird drinking well 83 and the reservoir 75, will, at all times, be below the inlet 45 of the water flow line which consists of the water feed screw 41. It will be recognized that, due to this construction, it is practically impossible for any food particles or other deleterious matter or bacteria from the beak of the bird, which may fall or pass into the water of the bird drinking well 83, to move backwardly into the feed lines of the device, such feed lines generally comprising ducts 5, 3, 11, 37 and 47.

Not only have we substantially eliminated the possibility of cross contamination by contamination of the water supply by having the feed line to the reservoir positioned at all times above the highest level which the water in the bird drinking well and the reservoir will reach, but we have also provided a further safeguard against such cross contamination. This further safeguard resides in the particular structure which we have developed, which provides a sinuous course for the water to follow in flowing from the reservoir 75 to the bird drinking well 83. This sinuous course results from the structural fact that the inlet ends 99 of each feed duct 85 is positioned opposite an end 55 of each arm 53 so that the water, which is flowing between the arms 53, must pursue a course to the ends of the arms and then laterally between each end 55 of the arms in the space between the forward ends of the arms 55 and the rear surface of wall 79 in order to reach the inlet ends of the ducts. These sinuous flow passages will reduce substantially the possibility of deleterious material flowing backward into the device from the bird drinking well into the reservoir. Another characteristic of this invention whereby cross contamination is prevented is that the device is so arranged and constructed, and operated in such a manner, that there is always a positive forward water pressure, which constitutes an additional factor in reducing the possibility of cross contamination.

When the device is disassembled in any manner whatsoever, it will be recognized that the water is automatically cut off, due to the fact that the pin 33 will be disengaged from the valve 17 so that the outlet from the passage 3 is automatically closed.

In order to prevent damage to the float valve assembly 61 when the component C is removed from the component B, we have provided the flanges 67 on the float assembly which prevents the float valve assembly from continuing its pivoting movement, since the flanges will engage the forward wall 49 of the component B. Not only is this structural arrangement significant in preventing possible damage to the float assembly if it were permitted to continue its downward pivoting action, but is also maintains it in position facilitating the assembly of the component C with the component B.

It is also a characteristic of this automatic drinking valve that, in the event that any sediment, or other deleterious material, were to flow backward from the bird drinking well to the reservoir 75, this reservoir may be cleansed without disassembling the entire device. This is accomplished merely by rotating the component C or the reservoir 180° and tilting it so that water will flow therefrom out of the vent 81 with a resultant cleansing action. In this operation of turning the reservoir upside down, the water therein will flow to the normal top thereof or the side thereof opposite to the float, so that the float will drop down and open the water inlet 45 so that there will be a constant flow of cleansing water into the reservoir.

It is also of importance to understand that the feed ducts 85 between the reservoir and the bird drinking well are formed in the well above the bottom thereof so that any contamination which might collect in the bottom of the drinking well will not flow rearwardly through these ducts into the reservoir.

The automatic drinking valve of this invention is adaptable for use where droppings from the bird might pass into the bird drinking well. This is apt to be the case where the water is being used for small birds which might stand on the top of the reservoir 75.

In order to eliminate this possibility, we have provided what we shall term a contamination shield which we have designated in its entirety by the numeral 105, and which we have disclosed in FIGS. 2 and 3 of the drawings. It is to be particularly understood that this contamination shield 105 is not necessary for the successful operation of our device and is purely optional. The contamination shield 105 comprises a shielding portion 107 which extends upwardly and forwardly from the reservoir 75 to extend over and above the bird drinking well 83. The shielding portion 107 is formed at its base with an annular or ring-like band element 109 which is of a size to slidably fit over the reservoir 75 and the components A and B. At its lower forward edge, the band 109 is formed with relief cuts forming a tab 111. A pin 113 is fixed to and projects downwardly from the reservoir, and when the contamination shield 105 is assembled with the device, it is slid forwardly thereover, and the tab 111, which is flexible, is engaged by the pin 113 which forces the tab downwardly until the pin reaches a hole 115 which has been formed in the tab, whereupon the tab 111, due to its flexibility, will move upwardly into normal position thereby locking the contamination shield into operative position.

In FIGS. 6, 7 and 8 of the drawings, we have disclosed a modified form of our invention which comprises all of the desirable characteristics of the form of the invention which we have described above, but is particularly adapted for the feeding of small animals. In the disclosure in the drawings of this form of our invention, we have used the same reference numerals which have been heretofore used to describe similar parts. It is also to be understood that components A and B in this form of our invention are the same as those previously described; however, the bird drinking well of the other form of our invention has been eliminated and in place thereof, the reservoir 75 is formed with a solid head or forward portion 117, having a vent 81A therein, the portion 117 being provided with a longitudinally extending duct 119 drilled therein which is in communication with the forward end of the reservoir 75. The duct 119 opens into a slightly enlarged chamber 121. The head 117 has an enlarged opening drilled therein which is in communication with the chamber 121 and is internally threaded as at 123. Inserted in this opening is a Teflon plug 125, of less diameter than the opening, which at its forward end is provided with a water flow duct 127 therein, which is open at its forward end, and at its rear end opens into a water supply chamber 129 of enlarged diameter. The outer end of the water supply chamber 129 is preferably of concave construction. The inner end of the plug 125 is provided with an annular shoulder or flange 131. The plug is maintained in position within the drilled hole in the head 117 by means of an externally threaded steel nut 133 having a central opening 135 therein. We provide a valve stem 137 which extends through the opening 135 and projects beyond the nut 133 as at 139, and at the area where the valve stem extends beyond the nut, we provide a concavity 141. Molded on the valve stem 137 is a valve 143 which is operable within the cavity or water supply chamber 129 and is configured in such a manner that it is adapted to seat on the concave forward section of the water supply chamber 129. The valve stem 137 is extended rearwardly as at 145 through the water supply chamber 129, and to its inner end is fixed, in any suitable manner, a diaphragm 147 which is maintained in operative position by being pressed, when the nut 133 is screwed into position, between the flange 131 and the body of the head 117. The diaphragm 147 is provided with a plurality of perforations 149 for a purpose which will become apparent as this description proceeds.

A supply of water flows through the duct 119, chamber 121 and through the perforations 149 in the diaphragm 147 into the water supply chamber 129 which is normally closed due to the seating of the valve 143 on the forward concave surface of the plug 125. When a small animal desires water, he uses his tongue and mouth to push inwardly on the projecting end 139 of the valve stem 137 which unseats the valve 143 to permit water to flow from the water chamber 129 and through the drilled hole 135 in the nut 133, such drilled hole, of course, being of greater diameter than the diameter of the valve stem 137, so that water is fed to the animal. When the animal has pushed inwardly on the valve 137, the diaphragm is flexed rearwardly by this action, as particularly disclosed in FIG. 7 of the drawings, and as long as pressure is maintained by the animal on the projecting end of the valve stem, the diaphragm will be so distorted. However, upon release of pressure, due to the flexibility and resilience of the diaphragm, it will move back into flat or normal position, as disclosed in FIG. 6 of the drawings, and the valve 143 will be seated and no more water will flow through the drilled duct 135. It will thus be appreciated that the diaphragm 147 functions to cause a closing of the valve and a stoppage of the water supply to the animal.

Consideration of the above description of the automatic drinking valve as particularly disclosed in FIGS. 6, 7 and 8 will clearly show that the valve is operative regardless of the pressure of the water being supplied thereto, since the vertebrate operating the valve causes the opening thereof, while the diaphragm 147 functions to automatically close the valve.

We claim:

1. An automatic drinking valve, comprising in combination, a water supply member in an accessible position for drinking by a vertebrate, a water supply reservoir in communication with said water supply member, and water feed means in communication with a source of water and opening into said reservoir for feeding water to said water supply reservoir, means within said water supply reservoir and operable to close said water feed means when the water in said water supply reservoir reaches a predetermined depth and to open said water feed means when the water in said water supply reservoir falls below said predetermined depth, said water feed means opening into said water supply reservoir at a point therein above the water level in said water supply reservoir when the water therein is at said predetermined depth, said water feed means being fixed to a component of the valve and said component including means fixed thereto and extending into said water supply reservoir, and said water supply reservoir being removably mounted and supported on said means which extend into said water supply reservoir.

2. An automatic drinking valve in accordance with claim 1, wherein water supply ducts are provided for flow of water from said water supply reservoir to said water supply member, and the outlets of said water supply ducts are above the bottom of said water supply member.

3. An automatic drinking valve in accordance with claim 2, wherein means are provided in said water supply reservoir causing the water flowing to said water supply ducts to flow in a sinuous course.

4. An automatic drinking valve in accordance with claim 1, wherein said water feed means is fixed to a component of the valve and said component includes means fixed thereto and extending into said water supply reservoir, and said means within said water supply reservoir which are operable to open and close said water feed means being pivotally mounted on said means extending into said water supply reservoir.

5. An automatic drinking valve in accordance with claim 4, wherein said means extending into said water supply reservoir comprise a pair of spaced apart arms, and said means within said water supply reservoir which are operable to open and close said water feed means are pivotally mounted for operation between said arms to open and close said water feed means in accordance with the depth of the water in the reservoir.

6. An automatic drinking valve in accordance with claim 1, wherein said water supply reservoir and said means which extend into said water supply reservoir are provided with mutually coactive means for detachably mounting said water supply reservoir on said means which extend thereinto.

7. An automatic drinking valve in accordance with claim 1, wherein said means fixed thereto comprise a pair of spaced apart semi-circular arms, each being provided with a circumferential groove therein, and said water supply reservoir is provided with a pair of inwardly extending pins insertable into said grooves for detachably mounting said water supply reservoir on said pair of semi-circular arms.

8. An automatic drinking valve in accordance with claim 1, wherein a contamination shield is removably mounted on said water supply reservoir and extends therefrom over and above said water supply member.

9. An automatic drinking valve in accordance with claim 1, wherein said water supply member comprises a water supply duct in communication with the water in said water supply reservoir, a valve in said water supply duct, means fixed to said valve and extending forwardly therefrom and beyond said water supply member and engageable by the vertebrate to move said valve to open position for flow of water to the vertebrate.

10. An automatic drinking valve in accordance with claim 9, wherein automatic valve closing means is fixed to said means which is fixed to said valve for closing the valve after it has been opened by the vertebrate.

11. An automatic drinking valve in accordance with claim 9, wherein said means which is fixed to said valve extends rearwardly from the valve and is affixed adjacent its rear end to an automatic valve closing diaphragm.

12. An automatic drinking valve in accordance with claim 11, wherein said diaphragm is formed with a plurality of apertures for passage of water therethrough.

13. An automatic drinking valve, comprising in combination, a water supply member in an accessible position for drinking by a vertebrate, a water supply reservoir in communication with said water supply member, and water feed means in communication with a source of water and opening into said reservoir for feeding water to said water supply reservoir, said water feed means being fixed to a component of the valve and said component including a pair of spaced-apart arms fixed thereto and extending into said water supply reservoir, means within said water supply reservoir pivotably mounted for operation between said arms and operable to close said water feed means when the water in said water supply reservoir reaches a predetermined depth and to open said water feed means when the water in said water supply reservior falls below said predetermined depth, said arms being positioned in the path of the water flowing from said water supply reservoir to said water supply member causing the flowing water to take a sinuous course, said water feed means opening into said water supply reservoir at a point therein above the water level in said water supply reservoir when the water therein is at said predetermined depth.

14. An automatic drinking valve, comprising in combination, a water supply member in an accessible position for drinking by a vertebrate, a water supply reservoir having means defining an opening in communication with said water supply member for providing flow of water therebetween, water feed means in communication with a source of water and opening into said reservoir for feeding water to said water supply reservoir, said water feed means being fixed to a component of the valve and said component including an arm fixed thereto and extending into said water supply reservoir, means within said water supply reservoir pivotally mounted relative to said arm and operable to close said water feed means when the water in said water supply reservoir reaches a predetermined depth and to open said water feed means when the water in said water supply reservoir falls below said predetermined depth, said water feed means opening into said water supply reservoir at a point therein above the water level in said water supply reservoir when the water therein is at said predetermined depth, and means positioned within said water supply reservoir closely adjacent the opening to said water supply member causing the water flowing from the water supply reservoir to the water supply member to take a sinuous course.

References Cited

UNITED STATES PATENTS

| | | | |
|---|---|---|---|
| 242,351 | 5/1881 | Merrell | 119—79 |
| 386,242 | 7/1888 | Fry | 137—448 |
| 551,027 | 12/1895 | Brown | 119—79 |
| 1,903,767 | 4/1933 | Karst | 119—75 |
| 1,917,371 | 7/1933 | Hill | 119—52 |
| 2,678,630 | 5/1954 | Frederiksen | 119—75 |
| 2,845,046 | 7/1958 | Hart | 119—75 |
| 3,118,426 | 1/1964 | Ealet | 119—75 |
| 3,191,622 | 6/1965 | Finlayson | 137—588 |
| 3,215,119 | 11/1965 | Graham | 119—75 |
| 3,263,652 | 8/1966 | Nakajima et al. | 119—72.5 |

ALDRICH F. MEDBERY, *Primary Examiner.*